United States Patent [19]
Kobayashi et al.

[11] 4,129,369
[45] Dec. 12, 1978

[54] PARALLAX COMPENSATING DEVICE FOR THE VIEW FINDER IN A CAMERA

[75] Inventors: Haruo Kobayashi; Toshinori Imura, both of Sakai, Japan

[73] Assignee: Minolta Camera Kabushiki Kaisha, Osaka, Japan

[21] Appl. No.: 783,948

[22] Filed: Apr. 1, 1977

[30] Foreign Application Priority Data

Apr. 8, 1976 [JP] Japan .................. 51-44168[U]

[51] Int. Cl.² .................. G03B 3/00; G03B 13/14
[52] U.S. Cl. .................. 354/197; 354/221
[58] Field of Search ........... 354/164, 167, 197, 221, 354/222

[56] References Cited

U.S. PATENT DOCUMENTS

| 2,973,700 | 3/1961 | Gebele | 354/221 X |
| 3,062,086 | 11/1962 | Papke | 354/221 X |
| 3,081,664 | 3/1963 | Papke | 354/221 |
| 3,836,934 | 9/1974 | Suzuki et al. | 354/221 X |
| 3,890,626 | 6/1975 | Ettischer | 354/197 |
| 3,893,135 | 7/1975 | Matsui et al. | 354/197 X |
| 4,038,673 | 7/1977 | Schroder | 354/222 |

Primary Examiner—John Gonzales
Attorney, Agent, or Firm—Watson, Cole, Grindle & Watson

[57] ABSTRACT

A camera which incorporates a supplemental lens that may be selectively used in combination with a normal picture-taking lens by moving a selector device projecting externally of the camera. Movement of the selector device results in the supplemental lens being moved either into or out of the optical path of the picture-taking lens. An objective lens which is positioned in the optical path of the view finder system is operable so as to be movable with respect to the view finder optical path upon movement of the supplemental lens to automatically compensate for parallax when the supplemental lens is positioned in the optical path of the picture-taking lens for modified photography.

6 Claims, 11 Drawing Figures

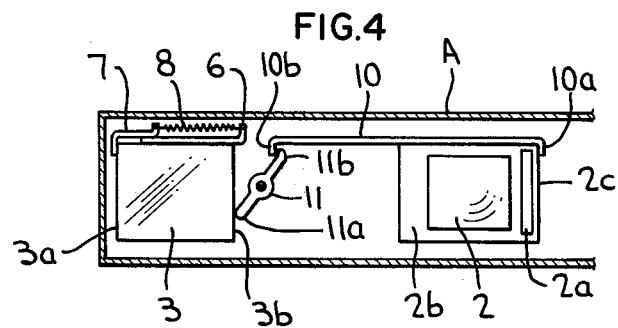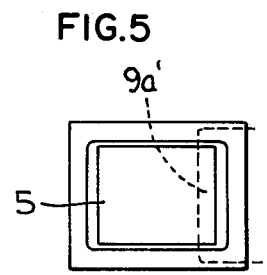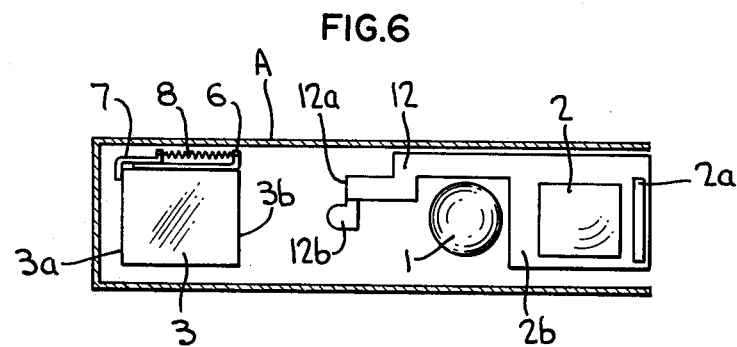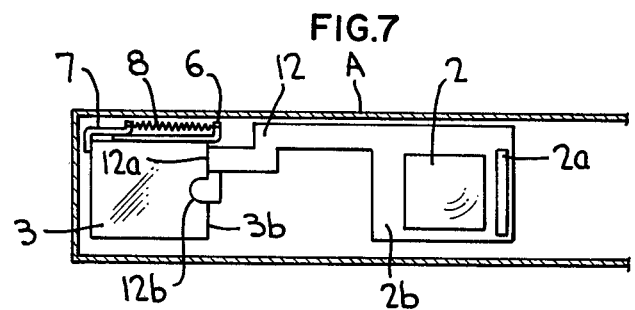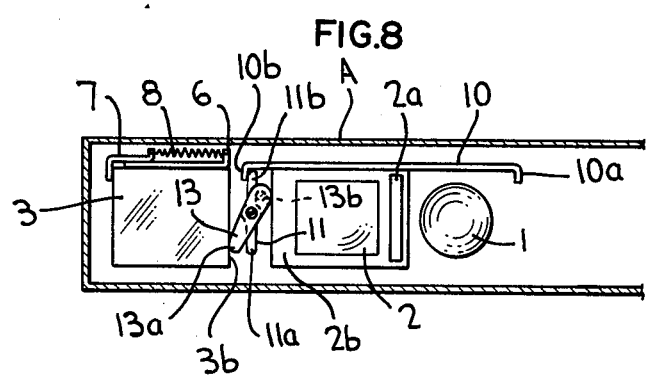

PARALLAX COMPENSATING DEVICE FOR THE VIEW FINDER IN A CAMERA

BACKGROUND OF THE INVENTION

1. Field of the Invention

The present invention relates to a parallax compensating device for the view finder of a camera, and more particularly to a parallax compensating device for use in a camera which incorporates a supplementary lens, such as a close-up lens, which is movable into the optical path of the regular lens in order to change the focal length thereof. Thus, the present invention relates to cameras in which a supplementary lens can be selectively put into combined use with a picture-taking lens by the operation of a selector device located externally of the camera.

2. Description of the Prior Art

Cameras which can incorporate a supplementary lens for varying the focal length of a regular lens, such as for instance a supplementary close-up lens which can be used to allow for the camera to take close-up pictures, are known in the photographic field. In order to compensate for parallax between the view finder and the different photographic optical systems, such conventional cameras are provided with a wedge-shaped prism which can be moved in front of the view finder optical system at the same time that the close-up lens is positioned in the photographic optical path of the regular lens, or with means to shift the field-limiting frame of the view finder. However, the provision of this wedge-shaped prism in a camera requires a significant amount of space for the wedge-shaped prism to be bodily moved within the camera and for housing the mechanism which is required for moving the wedge-shaped prism at the same time as the close-up lens is moved, thus resulting in an inability to reduce the size of the camera and hence in an inability to reduce the manufacturing cost. At the same time, when using a field-limiting frame, such a frame has to be moved within the view finder optical system, and the sizes of the optical elements which form the view finder optical system must be large enough to cover the field-limiting frame that moves as mentioned above. This results in an increase in the size of the view finder optical system. In addition, such a system suffers from the additional shortcoming that when the photographer looks through such a view finder, an unnecessary image (which in fact will not be part of the ultimate photograph) will be observable outside the field-limiting frame. This is in fact a significant drawback.

It is therefore an object of the present invention to provide a parallax compensating device which is simple in construction and which requires only a small space within the camera and therefore allows for a reduction in size and cost for the camera.

It is another object of the present invention to provide a parallax compensating device which provides automatic parallax compensation in response to a positioning of the supplementary lens in the optical path of a picture-taking lens, and which dispenses with particular prior art means to compensate for parallax, and which thereby simplifies the stand-by operation for taking a close-up picture.

It is a further object of the present invention to provide a parallax compensating device for a view finder in which an unwanted image which in fact will not be part of the photograph is not viewable outside a field-limiting frame in the view finder, but only the image of the object alone (which is to be taken as the picture) will be seen therein accurately.

It is a still further object of the present invention to provide a parallax compensating device which will clearly indicate a difference between two photographing conditions, i.e., the photographic condition in which the regular picture-taking lens is used alone, and the condition in which a supplementary lens is used in combination with the picture-taking lens.

SUMMARY OF THE INVENTION

According to the present invention a camera which is provided with a body, a photographic optical system, a view finder optical system and a supplementary lens that can be positioned either into or out of the photographic optical system, is also provided with a concave objective lens device which can be moved into or oriented within the view finder optical system for parallax compensation when the supplementary lens is positioned into the photographic optical path and an operating system which properly interconnects the concave objective lens device with the supplementary lens so that movement of the former will cause appropriate movement of the latter.

Further objects, advantages, and features of the present invention will be apparent in the arrangement and construction of the constituent parts in detail as set forth in the following specification taken together with the accompanying drawings.

BRIEF DESCRIPTION OF THE DRAWINGS

FIG. 3 and FIG. 4 are a plane view and a front view showing operating conditions of the embodiment of FIG. 1, respectively;

FIG. 5 is a view showing a field of view in a view finder;

FIG. 6 is a front view showing an outline of another embodiment of the present invention;

FIG. 7 is a front view showing an operating condition of the embodiment of FIG. 6.

FIG. 8 is a front view showing an outline of a still another embodiment of the present invention;

DETAILED DESCRIPTION OF THE PREFERRED EMBODIMENTS

Figure 1:
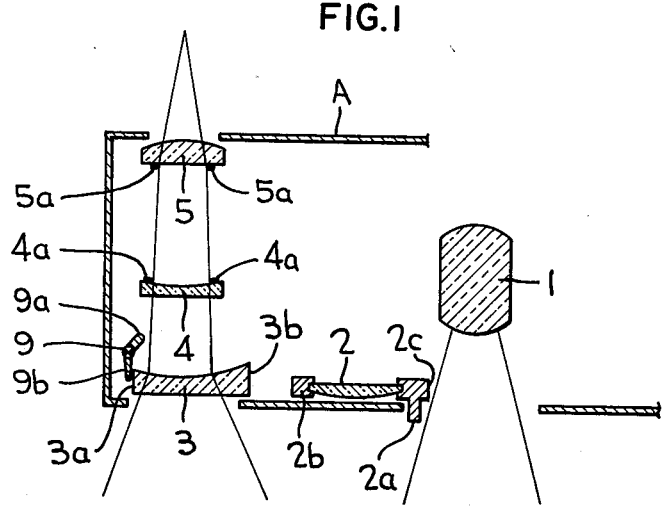
FIG. 1 is a cross-sectional, plane view showing an outline of one embodiment of the present invention.
Figure 2:
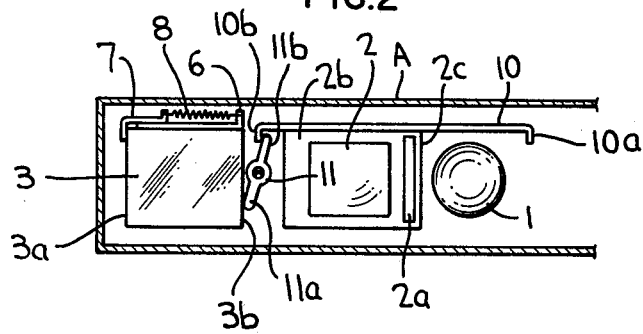
FIG. 2 is a front view of the embodiment of FIG. 1.

Referring now to FIGS. 1 and 2, a camera body of a small size camera, represented by A, is shown having a flat, rectangular paralleopiped form and including a view finder optical system and a photographic optical system (the optical axes of which are in the same plane parallel to the long side or short of the picture frame to be taken). A close-up lens 2, which is supported by lens frame 2b, is slidingly movable relative to the camera body A in a manner such that when selector portion 2a (which projects outside the camera body A) is operated, the close-up lens 2 may be moved from a position retracted from the front of picture-taking (regular) lens 1 into the optical path thereof. Concave objective lens 3, intermediate lens 4 and eye-piece 5 together form a well-known Albada view finder in which an image of a flame 5a is directed to the eye-piece 5 by mirror portion 4a on the back surface of the intermediate lens 4. Concave objective lens 3 may be slidingly moved to the right or left within a given range and in the same plane in the front portion of the camera as close-up lens 2 as can be appreciated from the drawing. Spring 8 has one end secured to spring hook 6 on the camera body A and the other end secured to a spring hook attached to the concave objective lens 3 so as to bias the concave objective lens 3 to the right at all times, thereby maintaining the concave objective lens 3 in an ordinary photographic position. Indicating member 9 is pivotable on the camera body in a rotatable manner and is integrally formed with both an indicating portion 9a, which may move into or out of the view finder optical path, and in operating portion 9b, which is positioned in the path of movement of the concave objective lens 3. Indicating member 9 is urged under the action of a spring (not shown) such that its operating portion 9b abuts the left-hand side 3a of concave objective lens 3, and only when operating portion 9b is moved to the left by means of the movement of concave objective lens 3 will the indicating portion 9a be moved from outside the optical path of the view finder to a position inside the view finder optical path.

Interconnecting member 10 extends along a sliding path for supplementary close-up lens 2, and is movable to the right or left within a given range. This interconnecting member 10 is formed with a bent portion 10a at its right-hand end and with bent portion 10b at its left-hand end, the bent portion 10a being positioned in the path of movement of close-up lens frame 2b, and the bent portion 10b being positioned such that it may engage rear end 11b of operating lever 11 which is pivoted to camera body A. Lever 11 is formed with an operating portion 11a which abuts the right-hand side surface 3b of concave objective lens 3.

FIGS. 1 and 2 show the positions of the respective members during photography with the picture-taking lens 1 alone. Close-up lens 2 is retracted to the left of the optical path of the picture-taking lens 1, while the concave objective lens 3 is shifted to its ordinary photographic position by the action of spring 8. In addition, interconnecting member 10 is biased to the left by means of operating lever 11.

For close-up picture-taking, the selector portion 2a of the close-up lens 2 is operated by the photographer from outside of the camera so as to slide it to the right such that close-up lens 2 is shifted into the optical path of the picture-taking lens 1. With this positioning of close-up lens 2, the right-hand end 2c of close-up lens frame 2b will abut the right-hand bent portion 10a interconnecting member 10 in a position close to the terminating end of the aforesaid sliding movement of the selector portion, thereby moving interconnecting member 10 to the right. Such a condition is shown in FIGS. 3 and 4.

The rightward movement of interconnecting member 10 will cause bent portion 10b at its left-hand end to engage the rear end 11b of the operating lever 11, thereby rotating the lever 11 in a clockwise direction so that the operating portion 11a will force concave objective lens 3 to the left against the action of spring 8. The objective lens 3 will thus be moved to a parallax compensating position in the view finder path. In other words, even if the field-limiting frame itself is fixed, i.e., even if lenses 4 and 5 are fixed, the field of view itself will be moved for compensating parallax due to the concave objective lens 3 being moved to a parallax compensating position.

The leftward movement of concave objective lens 3 causes indicating member 9, having operating portion 9b adapted to engage the left-hand end 3a, to rotate in a clockwise direction, thereby positioning its indicating portion 9a in the optical path of the view finder. As a result, there will appear in the view finder view screen, as shown in FIG. 5, an image 9a' (formed by indicating portion 9a) which will indicate that the close-up lens 2 has been positioned in the optical path of the picture-taking lens 1.

Figure 3:
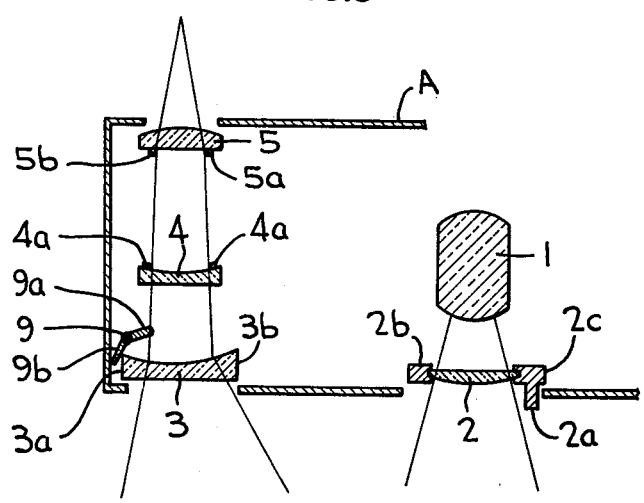

In order to restore the ordinary photographic conditions from the conditions shown in FIGS. 3 and 4, the close-up lens 2 is moved to the left by means of the selector portion 2a so that the concave objective lens 3 will be returned to its ordinary photographic position under the action of spring 8, while operating lever 11, interconnecting member 10 and indicator member 9 are all returned to their positions as shown in FIGS. 1 and 2.

FIG. 6 shows an arrangement wherein instead of utilizing an operating lever 11, an interconnecting member 10 and an indicator member 9 as in FIGS. 1–4, the close-up lens is positioned to the right of the picture-taking lens 1 (for ordinary photography) and is movable to the left from this position in order to be positioned in the optical path of picture-taking lens 1 when close-up photography is desired. In this embodiment, the close-up lens frame 2b is formed integrally with operating arm 12 which serves as a parallax compensating operating member and extends to the left of the picture-taking lens 1. Thus, as shown in FIG. 7, when the close-up lens 2 is shifted to the left for producing close-up photographic operation for the camera, tip 12a of the operating arm 12 will force the right-hand side surface 3b of the concave objective lens 3 into a parallax compensating position. In this embodiment, an indicating portion 12b is formed on the tip portion of the operating arm 12, thereby providing for and indication in the view finder screen that the respective members have been shifted into their close-up photographic positions. This is because indicating portion 12b will be moved from beside concave objective lens 3 into the optical path for the view finder as shown in FIG. 7. As can be seen from FIGS. 7 and 8, the number of parts in this embodiment are remarkably reduced and the mechanism very much simplified as compared with the embodiments shown in FIGS. 1 and 2.

When the close-up lens 2 is retracted from its close-up photographic position in FIG. 7 in order to allow for ordinary photography, then concave objective lens 3 is released from its positioning due to the movement of operating arm 12 so that lens 3 is returned to its ordinary photographic position by the action of spring 8. In addition, indicating portion 12b is retracted from its positioning in the optical path of the view finder.

Figure 9:
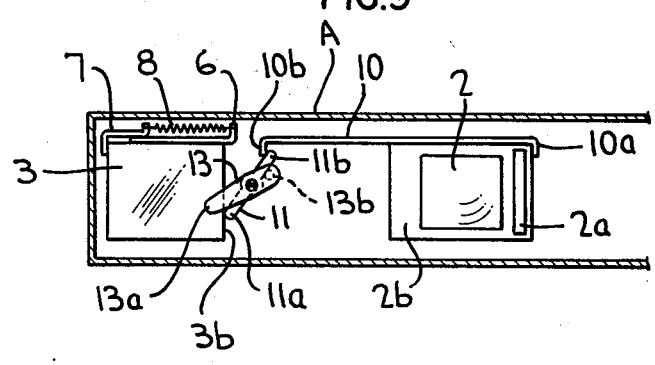
FIG. 9 is a front view illustrative of an operating condition of the embodiment of FIG. 8.

FIG. 8 shows still another embodiment of the invention. In this embodiment indicating member 13 (which corresponds to means 9 as shown in FIGS. 1 and 2) is positioned coaxially with operating lever 11; in fact, indicating member 13 is pivoted on the operating-lever shaft. Indicating member 13 is adapted to be rotated together with operating lever 11 by means of a pin 13b anchored in member 13 and a spring (not shown) having opposite ends secured to operating lever 11 and to pin 13b, respectively. In the ordinary photographic condition, indicating member 13 has its indicating portion 13a out of the optical path of the view finder as shown in FIG. 8, but is able to rotate in cooperation with the clockwise rotation of operating lever 11. This occurs only when the other members are set to close-up photographic positions, and is such that when rotated its indicating portion 13a is then positioned in the optical path of the view finder as shown in FIG. 9, thereby indicating to the photographer that his camera is set for close-up photography. In addition, indicating member 13 will follow the returning movement (counterclockwise rotation) of the operating lever 11 under the action of a spring (not shown) so that indicating member 13 may automatically return to the position of FIG. 8, i.e., when the camera is reset from close-up photographic condition to its ordinary photographic settings.

Figure 10:
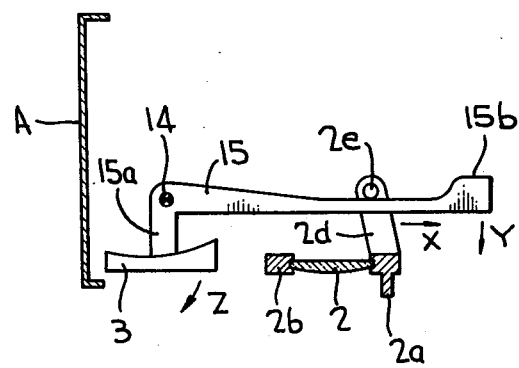
FIGS. 10 and 11 are plane view illustrative of essential parts of a further embodiment of the invention.

FIG. 10 shows a yet another embodiment of the present invention. The respective members are shown shifted to their ordinary photographic positions. When the close-up lens 2 is moved to the right (arrow direction X) towards the optical axis of the picture-taking lens (not shown) for close-up photography, then pin 2e on arm 2d is moved along a length of the operating lever 15. Operating lever 15, which is pivoted on pin 14 connected to the camera body A, is urged so as to rotate in a counterclockwise direction under the action of s spring (not shown). Secured to the tip of operating lever 15 is a concave objective lens 3 for a view-finder optical system. A cam 15b is located on the rear end of the operating lever 15. Accordingly, when the close-up lens 2 is moved to the right by movement of selector portion 2a by the photographer, the pin 2e will move together with the close-up lens 2 and will ride up on cam 15b at the terminating end of the movement of lens 2 so that operating lever 15 will be rotated in a clockwise direction (arrow direction Y). The rotation of operating lever 15 will cause concave objective lens 3 to move clockwise (arrow direction Z) to a parallax compensating position for the view finder.

Figure 11:
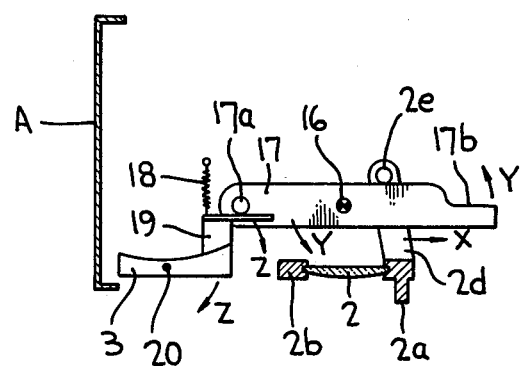

FIG. 11 shows a further embodiment of the invention. In this embodiment the parallax may be compensated for by the concave objective lens being rotated through a given angle. An operating lever 17, which is pivoted to camera body A by means of pivot 16, is biased so as to rotate in a counterclockwise direction under the action of weak spring 18. Operating portion 19 engages pin 17a positioned on the tip portion of operating lever 17. Cam portion 17b is located on the rear end of operating lever 17 for limiting the movement of the operating lever 17 by contact with a pin 2e located on the arm 2d of the close-up lens frame 2b.

The operating portion 19 is integrally connected to the concave objective lens 3 in the view finder optical system, while the concave objective lens 3 is rotatably supported on the camera body A by means of a pivot 20. FIG. 11 shows the positions of the respective members when the camera is set for ordinary photography.

For close-up photography, i.e., when the close-up lens 2 is moved to the right (arrow direction X) by the photographer, pin 2e is also moved so as to face cam portion 17b of the operating lever 17. This occurs immediately before the lens 2 is brought to its needed position in the optical path of the picture-taking lens. At this time operating lever 17 whose rotation in the counterclockwise direction (arrow direction Y) has been hindered by means of pin 2e, is allowed to rotate in a counterclockwise direction (arrow direction Y). The rotation of the operating lever 17 causes the operating member 19 to be rotated, together with concave objective lens 3, in a clockwise direction Z, with the result that concave objective lens 3 is to be automatically shifted to its parallax compensating position.

With the embodiments as shown in FIGS. 10 and 11, the respective members are returned to their ordinary photographic positions when close-up lens 2 is returned to its position shown (ordinary photographic position) like the cases of the preceding embodiments.

We claim:

1. A camera which comprises sides which together form a small size body having a flat rectangular paralleopiped form and a photographic optical system having a photographic optical axis oriented perpendicular to a plane delineated by a side of said camera with the longest and shortest dimensions of the paralleopiped form, said camera also comprising:

a view finder optical system having a view finder optical axis oriented in parallel with said photographic optical axis;

close-up lens means for changing the focal length of said photographic optical system to that for close-up photography, said close-up lens means being movable between an operating position in alignment with said photographic optical axis and a retracted position in a space between the optical axis of said photographic optical axis and said view finder optical axis where said close-up lens means is out of alignment with said photographic optical axis;

concave objective lens means provided in said view finder optical system, said concave objective lens means being movable in a direction parallel to the locus of the movement of said close-up lens so as to be selectively positionable between an ordinary photographic position and a compensating position for compensating for finder parallax, upon close-up photography; and an operating means which is interactable with said concave objective lens means and which is movable in accordance with the positioning of said close-up lens means to move said concave objective lens means from said ordinary photographic position to said compensating position when said close-up lens is positioned in the photographic optical axis.

2. A camera as set forth in claim 1, wherein said camera includes an indicating means movable between a first position in the view finder optical path, and a second position retracted out of the view finder optical path, said indicating means being positioned to be directly moved from said second position to said first position by the movement of said concave objective lens means to its compensating position.

3. A camera as set forth in claim 2, wherein said close-up lens means includes a close-up lens and a frame for holding said close-up lens therein, wherein said close-up lens means is movable in a longitudinal direction of the camera body, wherein said concave objective lens means is movable in a direction parallel with said longitudinal direction, and wherein said operating means includes an operating portion integrally provided on said frame and a rotatable lever provided between said optical axes, said rotatable lever having opposite ends, one of which is interconnected with said concave objective lens means and the other of which is interconnected with said operating portion.

4. A camera which comprises sides which together form a small size body having a flat rectangular paralleopiped form and a photographic optical system having a photographic optical axis oriented perpendicular to a plane delineated by a side of said camera with the longest and shortest dimensions of the paralleopiped form, said camera also comprising:

a view finder optical system having a view finder optical axis oriented in parallel with said photographic optical axis;

close-up lens means for changing the focal length of said photographic optical system to that for close-up photography, said close-up lens means being movable between an operating position in alignment with said photographic optical axis and a retracted position in a space between the optical axis of said photographic optical axis and said view finder optical axis where said close-up lens means is out of alignment with said photographic optical axis;

concave objective lens means provided in said view finder optical system, said concave objective lens means being mounted for rotation about an axis perpendicular to the view finder optical axis so as to be selectively positionable between an ordinary photographic position and a compensating position for compensating for finder parallax, upon close-up photography; and an operating means which is interactable with said concave objective lens means and which is movable in accordance with the positioning of said close-up lens means to rotate said concave objective lens means from said ordinary photographic position to said compensating position when said close-up lens is positioned in the photographic optical axis.

5. A camera as set forth in claim 4, wherein said concave objective lens means includes a concave objective lens and a holding lever rotatable about an axis perpendicular to the view finder optical axis having one end which holds said concave objective lens and another end formed with a cam portion; and wherein said operating portion includes a drive lever which is movable in cooperation with the movement of said close-up lens and an engaging portion which is provided on said drive lever and engages said cam portion for rotating said holding lever, thereby moving said concave objective lens to a compensating position by following an arcuate path when said close-up lens is moved to a position in the photographic optical axis.

6. A camera as set forth in claim 4, wherein said concave objective lens means includes a concave objective lens having an edge portion thereof which is closer to the photographic optical axis of increased thickness as compared to the center portion located away from the photographic optical axis and which includes pivotally movable holding portion holding said concave objective lens for allowing said concave objective lens to rotate about an axis perpendicular to the view finder optical axis, said holding portion including means passing through said concave objective lens for moving the increased thickness portion to a protruding position towards the photographic image, and wherein said operating portion includes an operating member movable together with said close-up lens, a drive lever pivotably connected to the camera body and capable of moving said concave objective lens from its ordinary photographic position to its compensating position when rotated through a given angle, and a cam drive portion provided between said operating member and said drive lever such that said drive lever is rotated when said operating member is moved in cooperation with the movement of the close-up lens to a position in the photographic optical axis.

* * * * *